UNITED STATES PATENT OFFICE.

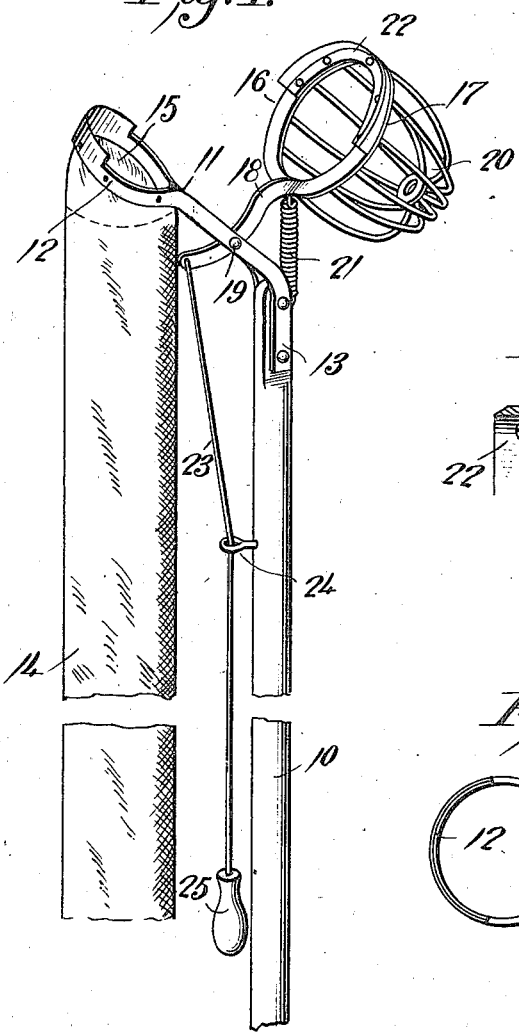

WILLIAM A. CISNE, OF INDEPENDENCE, MISSOURI.

FRUIT-PICKER.

1,090,685.     Specification of Letters Patent.     Patented Mar. 17, 1914.

Application filed July 13, 1912. Serial No. 709,173.

*To all whom it may concern:*

Be it known that I, WILLIAM A. CISNE, a citizen of the United States, residing at Independence, in the county of Jackson and State of Missouri, have invented new and useful Improvements in Fruit-Pickers, of which the following is a specification.

An object of the invention is to provide a fruit picker whereby such fruits as peaches, pears, apples and the like can be readily picked by a person standing on the ground without injuring the trees or bruising the fruit.

The invention embodies, among other features, a handle having a poke or bag rigidly mounted on the upper end thereof, a basket provided with a cutting knife being movably mounted and supported on the frame of the poke or bag and adapted to engage and cut the fruit from the tree, the basket being then movable into a position over the hood of the poke or bag so that the fruit will pass therein, the basket being preferably spring-engaged to return to initial position each time after the fruit has been conveyed from the basket to the poke.

In the further disclosure of the invention reference is to be had to the accompanying drawings, constituting a part of this specification, in which similar characters of reference denote corresponding parts in all the views, and in which:

Figure 1 is a perspective view of the device showing the basket in initial position; Fig. 2 is a vertical sectional view taken through a portion of the basket; and Fig. 3 is a plan view of the supporting frame of the poke, the hood having been removed.

Referring more particularly to the views, use is made of a handle 10 having rigidly secured to the upper end thereof a poke frame 11, said poke frame being preferably formed of a single piece of band-like material bent to form a loop 12, the free ends of the piece of material being spaced apart and constituting supporting members 13, the extremities of the supporting members being rigidly secured to the upper end of the handle 10 as shown, a suitable poke or bag 14 having the upper end thereof riveted or otherwise secured to the loop 12 of the poke frame 11 with the upper extremity of the poke or bag projecting upwardly beyond the loop to form a head 15, the loop 12 of the poke frame being spaced from the handle 10 as shown.

A basket frame 16 is movably carried by the poke frame 11 and preferably consists of a single piece of band-like material bent to form a loop 17 and having the shank 18 thereof interposed between the supporting members 13 of the poke frame 11, a suitable pin 19 being passed through the supporting members 13 and shank 18 to journal the basket frame 16 on the poke frame 11, a basket 20 being secured to the basket frame 16 in any suitable manner with a contractile coiled spring 21 secured to the basket frame 16 adjacent the basket 20 and to the handle 10 adjacent the upper end thereof, the said spring 21 being adapted to retain the basket frame 16 and basket 20 in initial position as shown in the drawing. A semi-circular knife 22 is connected to the basket frame 16 by means of suitable screws, the said knife having the sharpened portion thereof extending longitudinally to the basket 20 to cut the stem of the fruit when it is desired to sever the fruit from the tree. A cord 23 is secured to the extremity of the shank 18 and extends through eyelets 24 mounted on the handle 10, a suitable grip 25 being secured to the lower end of the cord 23 adjacent the lower end of the handle 10.

In the use of the device, the basket is arranged immediately in front of the fruit on the tree by extending the handle upwardly into the branches of the tree and a pull is then exerted on the cord 23, thus swinging the basket forwardly toward the poke frame 11 so that the knife 22 of the basket frame 16 will sever the stem of the fruit and the fruit will then drop into the basket 20, it being readily seen that the basket is at this time being carried forward and into position immediately over the hood 15 of the poke 14, thus causing the fruit to gravitate into the poke, after which pressure is released on the cord 23 and the contractile spring 21 will then return the basket 20 to initial position, after which the basket is moved into position in front of the next fruit that is to be severed from the tree.

It should be noted that the device described consists of few parts and by forming the poke frame 11 and basket frame 16 each of a single piece of material and assembling the same in the manner mentioned, the device can be cheaply manufactured, while at the same time the device will be durable and efficient.

Having thus described my invention, I claim:

In a fruit picker, the combination with a handle, of a poke frame supported thereon and consisting of a single piece of material bent upwardly and away from the handle and looped to form a knife, a poke carried on the loop of the frame and depending therefrom in parallel relation to the said handle, a basket frame mounted to swing on the poke frame and bent upwardly and away therefrom to lie outside of the longitudinal plane of the handle, a spring secured to the basket frame and having connection with the handle, and a cord having connection with a projecting portion of the basket frame and depending between the handle and the poke for swinging the basket frame against the action of the spring and into engagement with the poke frame.

In testimony whereof I affix my signature in presence of two witnesses.

WILLIAM A. CISNE.

Witnesses:
C. E. KRIMINGER,
MARY FLYNN.